(12) United States Patent
Kisch et al.

(10) Patent No.: US 11,577,476 B2
(45) Date of Patent: Feb. 14, 2023

(54) ACTIVE COOLING SYSTEM FOR MANUFACTURING COMPOSITE STRUCTURES

(71) Applicant: The Boeing Company, Chicago, IL (US)

(72) Inventors: Robert A. Kisch, Burien, WA (US); Brice A. Johnson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/455,808

(22) Filed: Nov. 19, 2021

(65) Prior Publication Data

US 2022/0072815 A1 Mar. 10, 2022

Related U.S. Application Data

(62) Division of application No. 16/384,103, filed on Apr. 15, 2019, now Pat. No. 11,214,022.

(Continued)

(51) Int. Cl.
*B32B 41/00* (2006.01)
*B29C 70/38* (2006.01)
(Continued)

(52) U.S. Cl.
CPC .......... *B29C 70/384* (2013.01); *B29C 70/382* (2013.01); *B29C 70/54* (2013.01); *B29L 2031/3076* (2013.01)

(58) Field of Classification Search
CPC ....... B29C 70/54; B29C 70/382; B29C 35/16; B29C 70/388; B29C 2035/1616;
(Continued)

(56) References Cited

U.S. PATENT DOCUMENTS 5,110,395 A 5/1992 Vaniglia
5,700,347 A 12/1997 McCowin
(Continued)

FOREIGN PATENT DOCUMENTS

CN 104023952 A 9/2014
CN 108422682 A 8/2018
(Continued)

OTHER PUBLICATIONS

European Patent Office Extended Search Report, dated Jul. 20, 2020, regarding Application No. EP20151618.4, 10 pages.
(Continued)

*Primary Examiner* — Michael N Orlando
*Assistant Examiner* — Joshel Rivera
(74) *Attorney, Agent, or Firm* — Yee & Associates, P.C.

(57) ABSTRACT

A composite manufacturing system is provided. The composite manufacturing system comprises a fiber placement head, a compaction roller associated with the fiber placement head, and a temperature regulation system associated with the compaction roller. The temperature regulation system is configured to actively control a temperature of the compaction roller. The temperature regulation system comprises a number of temperature sensors, a cooling system, and a controller. The number of temperature sensors are configured to detect the temperature of the compaction roller. The cooling system is associated with the compaction roller and is configured to cool the compaction roller. The controller is in communication with the number of temperature sensors and the cooling system. The controller is configured to cool the compaction roller such that the temperature is below a threshold temperature.

20 Claims, 9 Drawing Sheets

Related U.S. Application Data (60) Provisional application No. 62/812,008, filed on Feb. 28, 2019.

(51) Int. Cl.
*B29C 70/54* (2006.01)
*B29L 31/30* (2006.01)

(58) Field of Classification Search
CPC ........... B29C 2035/1658; B29C 70/384; B29L 2031/3076; Y02T 50/40
USPC ................... 156/60, 64, 350, 351, 378, 379
See application file for complete search history.

(56) References Cited

U.S. PATENT DOCUMENTS

| | | |
|---|---|---|
| 9,080,024 B2 | 7/2015 | Weimer et al. |
| 2007/0187021 A1 | 8/2007 | Oldani et al. |
| 2008/0093026 A1 | 4/2008 | Naumann |
| 2011/0011537 A1 | 1/2011 | Hamlyn et al. |
| 2014/0190629 A1 | 7/2014 | Benson et al. |
| 2018/0111341 A1 | 4/2018 | Leborgne |
| 2019/0061282 A1 | 2/2019 | Johnson et al. |

FOREIGN PATENT DOCUMENTS

| | | |
|---|---|---|
| DE | 204 880 A1 | 12/1983 |
| EP | 1 593 474 A1 | 11/2005 |
| FR | 2996491 A1 | 4/2014 |

OTHER PUBLICATIONS

European Patent Office Communication pursuant to Article 94(3) EPC, dated Nov. 8, 2021, regarding Application No. EP20151618.4, 5 pages.

European Patent Office Communication pursuant to Article 94(3) EPC, dated Jun. 29, 2022, regarding Application No. EP20151618.4, 7 pages.

Notification of the First Office Action regarding Chinese Application No. 2020100976940, dated Oct. 28, 2022, 18 pages.

ACTIVE COOLING SYSTEM FOR MANUFACTURING COMPOSITE STRUCTURES

CROSS REFERENCE TO RELATED APPLICATIONS

This application is a divisional of, and claims a benefit of priority from, co-pending U.S. Utility patent application Ser. No. 16/384,103, filed Apr. 15, 2019; and this application is related to, and claims the benefit of priority from, U.S. Provisional Patent Application Ser. No. 62/812,008, filed Feb. 28, 2019, the entire contents of both of which are hereby expressly incorporated herein by reference for all purposes.

BACKGROUND INFORMATION

1. Field

The present disclosure relates generally to manufacturing composite structures. More specifically, the present disclosure relates to an active cooling system used in manufacturing composite structures for aircraft applications.

2. Background

Manufacturers increasingly use composite structures to provide light-weight and structurally sound parts for various applications. Some of these composite structures are manufactured using automated fiber placement systems. With such techniques, composite material is heated, and a compaction roller joins the composite material to a substrate. Automated fiber placement systems provide a higher level of precision than manual techniques when using complex tooling and increase the rate of production of composite structures.

The fiber placement head usually employs a heater directed toward the substrate to improve tack and adhesion of the composite material. As material is laid down onto the substrate, other components within the system are heated as well. The temperature of such components may be more difficult to control than desired. For example, if the compaction roller gets too hot, the composite material may stick to the compaction roller instead of joining with the substrate. When this situation occurs, the composite material wraps around the roller, which can impact production flow as the machine must be stopped and the compaction head must be cleaned. Roller wrap also may have an impact on placement quality which needs to be addressed, resulting in further delay and/or impact to flow.

Therefore, it would be desirable to have a method and apparatus that takes into account at least some of the issues discussed above, as well as other possible issues.

SUMMARY

An illustrative embodiment of the present disclosure provides a composite manufacturing system comprising a fiber placement head, a compaction roller associated with the fiber placement head, and a temperature regulation system associated with the compaction roller. The temperature regulation system is configured to actively control a temperature of the compaction roller. The temperature regulation system comprises a number of temperature sensors, a cooling system, and a controller. The number of temperature sensors are configured to detect the temperature of the compaction roller. The cooling system is associated with the compaction roller and is configured to cool the compaction roller. The controller is in communication with the number of temperature sensors and the cooling system. The controller is configured to cool the compaction roller such that the temperature is below a threshold temperature.

Another illustrative embodiment of the present disclosure provides a method for regulating a temperature of a compaction roller in a composite manufacturing system. A temperature sensor senses a temperature of the compaction roller. A controller then determines whether the temperature of the compaction roller is below a threshold temperature. If the temperature of the compaction roller is above the threshold temperature, the controller regulates a cooling system to cool the compaction roller until the temperature of the compaction roller is below the threshold temperature.

A further illustrative embodiment of the present disclosure provides a method for forming a composite structure for an aircraft using an automated fiber placement system. Composite material is positioned relative to a substrate. The composite material is heated. A compaction roller applies pressure to the heated composite material to join the material to the substrate. As the composite material is laid up, a temperature sensor senses a temperature of the compaction roller. A controller determines whether the temperature of the compaction roller is below a threshold temperature. If the temperature is not below the threshold temperature, the compaction roller is cooled until the temperature is below the threshold temperature.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current manufacturing processes for composite structures may present challenges in controlling the temperature of elements within the system. Some automated fiber placement systems (AFPs) do not regulate the temperature of the compaction roller. When the compaction roller surface is heated above a threshold temperature, the composite material sticks to the compaction roller rather than joins with the substrate. As a result, roller wrap occurs, making it necessary to take the AFP offline to remove debris from the roller. This downtime affects the efficiency of the composite manufacturing system.

The illustrative embodiments also recognize and take into account that when using thermoplastics, the heating element in the AFP may reach in excess of seven hundred degrees Fahrenheit. Such temperatures risk degradation of the compaction roller more quickly than desired. Without proper cooling, the compaction roller needs to be replaced frequently, taking the system offline and increasing manufacturing costs.

Further, the illustrative embodiments recognize and take into account that when the composite fiber material is hotter than desired, it becomes difficult to maneuver the tows into place. The faster the material cools to room temperature, the less likely it is to peel off the surface of the substrate after the compaction roller passes. Wrinkles or puckering may occur on complex surfaces if the material remains too hot to join with the substrate.

Some currently employed solutions direct cool air toward the surface of the compaction roller to help mitigate excess heat. These solutions, however, do not address the changing temperature of the compaction roller during different stages of manufacturing. For instance, at the start of fiber placement, uncontrolled cooling systems are counter-productive as they make it harder for the heater to heat the tows for better tack. Further, in some cases, even with the convective cooling from the air nozzles, roller wrap still occurs. Many fiber placement systems do not have compaction roller cooling mechanisms at all.

Thus, the disclosed embodiments provide a composite manufacturing system with actively controlled temperature regulation to prevent roller wrap and undesired inconsistencies from forming on a composite structure. The composite manufacturing system comprises a fiber placement head, a compaction roller associated with the fiber placement head, and a temperature regulation system. The temperature regulation system is associated with the compaction roller and is configured to actively control a temperature of the compaction roller. The temperature regulation system comprises a number of temperature sensors, a controller, and a cooling system. The controller is in communication with the number of temperature sensors and the cooling system. The number of temperature sensors are configured to detect the temperature of the compaction roller. If the temperature of the compaction roller is above a threshold temperature, the controller is configured to activate the cooling system to cool the compaction roller until the temperature is below the threshold temperature.

Figure 1:
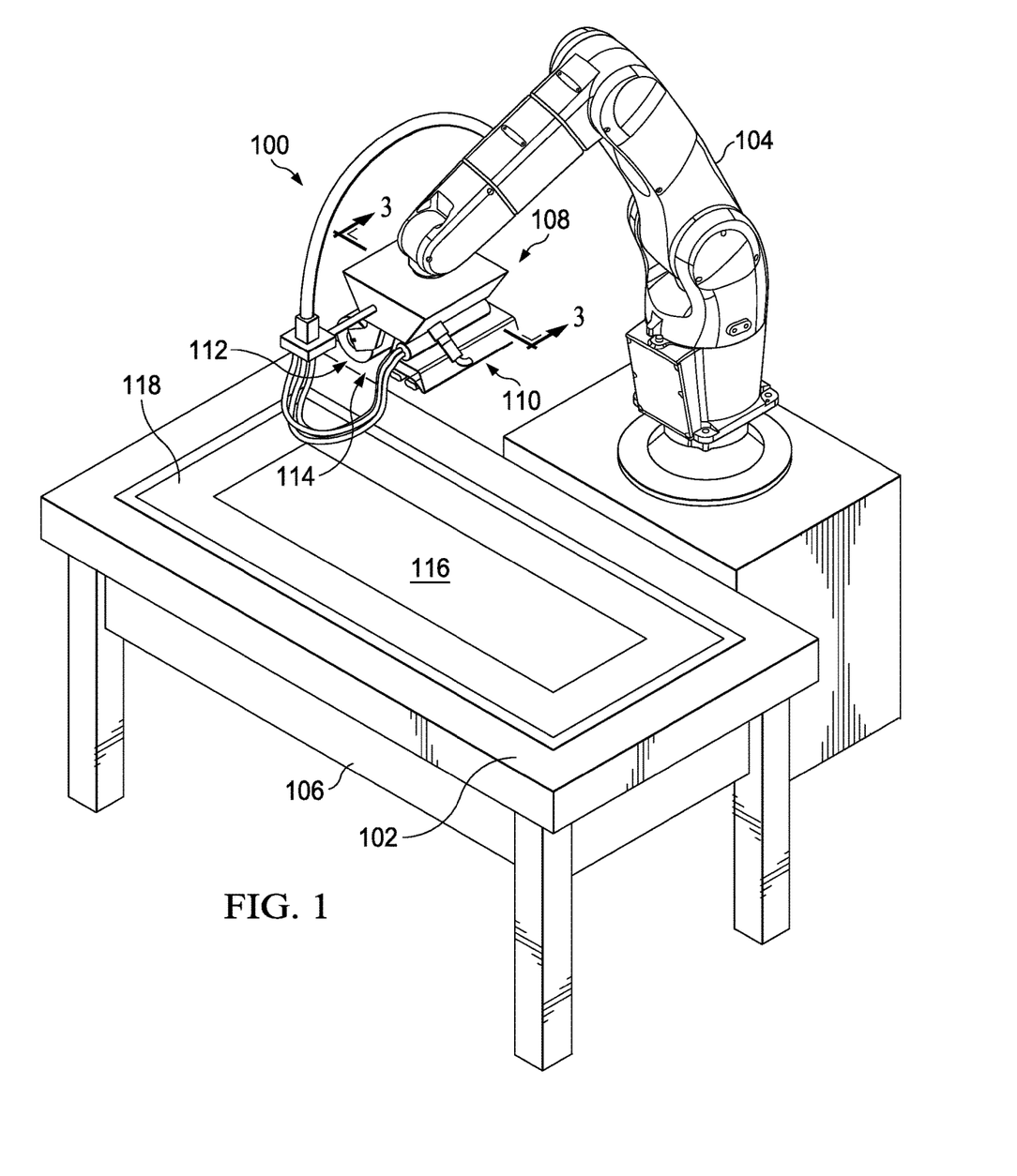
FIG. 1 is an illustration of a perspective view of a composite manufacturing system in accordance with an illustrative embodiment.

With reference now to the figures and, in particular, with reference to FIG. 1, an illustration of a perspective view of a composite manufacturing system is depicted in accordance with an illustrative embodiment. Composite manufacturing system 100 is an automated fiber placement system in this illustrative example.

As used herein, the term "automated fiber placement system" also may be known as or used interchangeably with "advanced fiber placement system." Composite manufacturing system 100 comprises a combination of automated components and/or devices capable of joining composite material with a substrate to form a composite structure.

As depicted, composite manufacturing system 100 includes tool 102, robotic arm 104, support structure 106, fiber placement head 108, heater 110, compaction roller 112, and temperature regulation system 114. Composite manufacturing system 100 is used to place composite material 116, in the form of tows, onto substrate 118.

Figure 2:
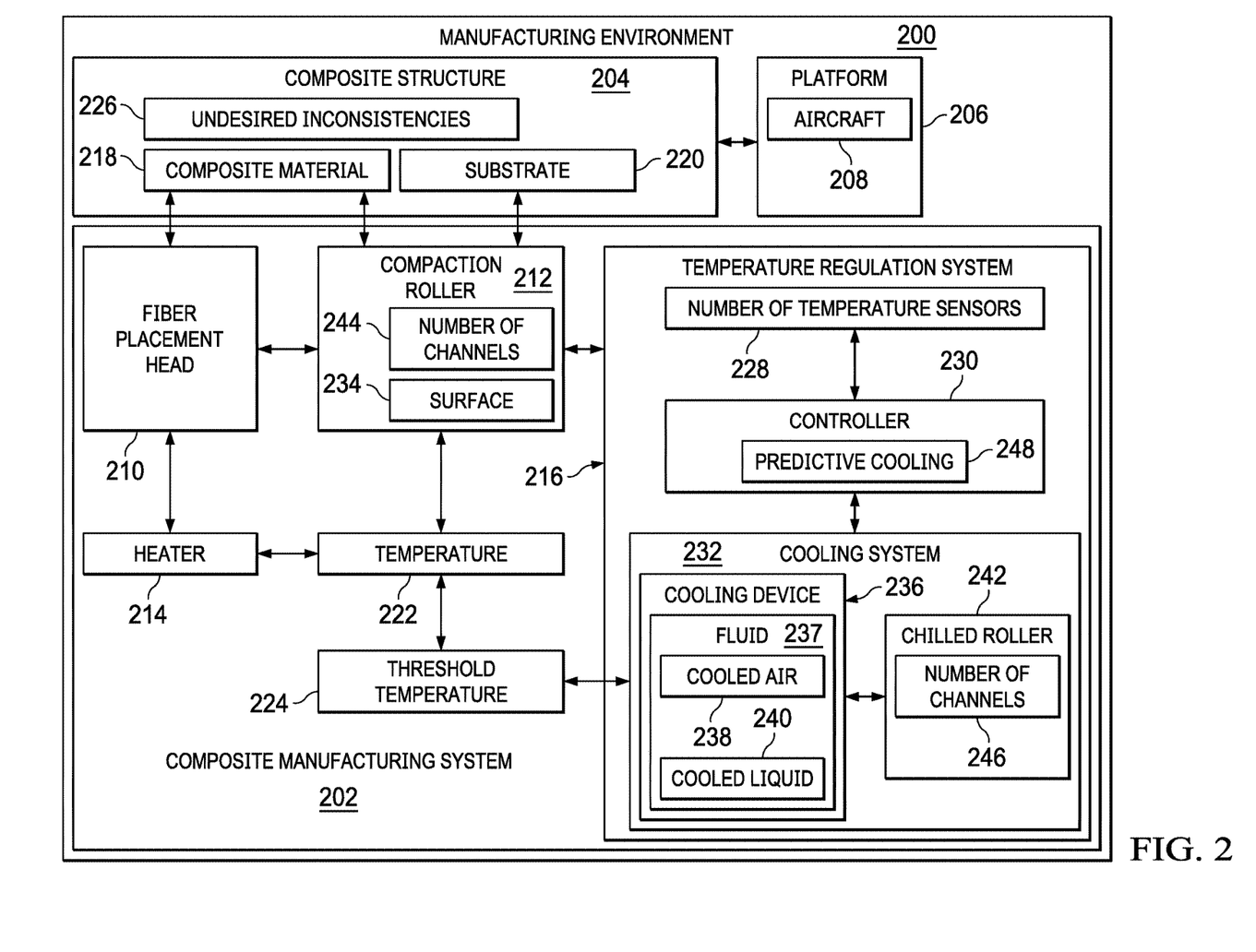
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within composite manufacturing system 202 may be used to fabricate composite structure 204.

Composite structure 204 is a structure configured for use in platform 206. Platform 206 may be, for example, without limitation, a mobile platform, a stationary platform, a land-based structure, an aquatic-based structure, or a space-based structure. More specifically, platform 206 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 208 in this illustrative example. When composite structure 204 is manufactured for aircraft 208, composite structure 204 may be, for example, without limitation, a stringer, a spar, a rib, a panel, a stabilizer, a skin panel, or some other suitable structure configured for use in aircraft 208.

As depicted, composite manufacturing system 202 comprises fiber placement head 210, compaction roller 212, heater 214, and temperature regulation system 216. Composite manufacturing system 202 is an advanced fiber placement system in this illustrative example.

As illustrated, fiber placement head 210 is a device configured to place composite material 218 on substrate 220 to form composite structure 204. Composite material 218 takes the form of tows in this illustrative example. Fiber placement head 210 guides placement of composite material 218 on substrate 220 in a desired geometry.

Compaction roller 212 is associated with fiber placement head 210. Compaction roller 212 is a device configured to consolidate heated composite material 218 and substrate 220. Compaction roller 212 applies enough pressure to join heated composite material 218 to substrate 220.

In this illustrative example, heater 214 is associated with fiber placement head 210. Heater 214 is configured to heat composite material 218 for placement on substrate 220. Heater 214 may take the form of an infrared heater, a laser, or other suitable types of heating mechanisms. Heater 214 heats composite material 218 to enhance the adherence (tack) of composite material 218 to substrate 220.

As composite manufacturing system 202 lays composite material 218 onto substrate 220, heat from heater 214 increases temperature 222 of compaction roller 212. As the process continues, heater 214 may increase temperature 222 of compaction roller 212 above threshold temperature 224 for compaction roller 212. Threshold temperature 224 is a temperature selected for compaction roller 212 that prevents at least one of roller wrap, wrinkles in composite material 218, puckering of composite material 218, or other undesired inconsistencies 226 in composite structure 204.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

As depicted, temperature regulation system 216 is associated with compaction roller 212. Temperature regulation system 216 is configured to actively control temperature 222 of compaction roller 212 to keep temperature 222 of compaction roller 212 below threshold temperature 224.

In this illustrative example, temperature regulation system 216 comprises number of temperature sensors 228, controller 230, and cooling system 232. As used herein, "a number of" when used with reference to items means one or more items. Thus, a number of temperature sensors is one or more temperature sensors.

As illustrated, number of temperature sensors 228 are associated with surface 234 of compaction roller 212. One or more of number of temperature sensors 228 may take the form of a thermostat, an infrared sensor, a thermal radiation sensor, a pyrometer, a thermocouple, or some other suitable type of temperature sensor. Number of temperature sensors 228 may be contact or non-contact sensors in these illustrative examples. Number of temperature sensors 228 are configured to continuously sense temperature 222 of compaction roller 212 and send feedback to controller 230.

In this depicted example, controller 230 communicates with number of temperature sensors 228 and cooling system 232. Specifically, controller 230 is configured to receive information about temperature 222 of compaction roller 212, compare temperature 222 to threshold temperature 224 for compaction roller 212, and activate cooling system 232 accordingly to cool compaction roller 212 until temperature 222 is below threshold temperature 224. Controller 230 is active during the entire composite manufacturing process. In other illustrative examples, controller 230 may keep temperature 222 within a desired range of temperatures.

Cooling system 232 comprises cooling device 236. Cooling device 236 may take the form of a chiller in this illustrative example. Cooling device 236 is configured to supply fluid 237 to compaction roller 212 until temperature 222 of surface 234 of compaction roller 212 is below threshold temperature 224. Cooling device 236 is configured to cool fluid 237 in a desired manner prior to supplying fluid 237 to compaction roller 212.

Fluid 237 may take the form of cooled air 238, cooled liquid 240, or some other suitable type of fluid. Flow of fluid 237 may be controlled by controller 230 using a number of components within cooling system 232 such as, for example, without limitation, valves, supply lines, pipes, transport elements, or other suitable components.

In some illustrative examples, cooling device 236 supplies fluid 237 into compaction roller 212 to cool surface 234 of compaction roller 212 from the inside out. In other words, compaction roller 212 is hollow such that cooled air 238 is dissipated out of the opposite end of compaction roller 212. In other illustrative examples, additional cooled air supplies may cool surface 234 directly as well.

In some illustrative examples, cooling system 232 comprises chilled roller 242. Chilled roller 242 is in conductive contact with compaction roller 212. One or more of number of temperature sensors 228 may be associated with chilled roller 242 in this illustrative example.

Instead of using fluid 237 to cool compaction roller 212 directly, cooling device 236 supplies at least one of cooled air 238 or cooled liquid 240 to chilled roller 242. Chilled roller 242 then cools compaction roller 212 through conduction. When cooled liquid 240 is used, cooled liquid 240 will be circulated through number of channels 246 and recirculated back to cooling device 236 to prevent contamination of the composite material 218.

Compaction roller 212 comprises number of channels 244. Fluid 237 flows through number of channels 244 within compaction roller 212 to cool compaction roller 212. In a similar fashion, chilled roller 242 comprises number of channels 246. Cooled air 238 and cooled liquid 240 may flow through number of channels 246 within chilled roller 242 to cool chilled roller 242. Number of channels 244 and number of channels 246 may take various forms, have various geometries, and may extend through the entire length of compaction roller 212 and chilled roller 242, respectively, or only part of the length of compaction roller 212 and chilled roller 242.

As illustrated, controller 230 actively controls cooling system 232 depending on temperature 222 of compaction roller 212. Controller 230 may increase the flow of at least one of cooled air 238 or cooled liquid 240 to compaction roller 212. In some cases, controller 230 may shut off cooling device 236 entirely. In other illustrative examples, controller 230 also may be associated with heater 214 and control both devices in tandem to keep temperature 222 of compaction roller 212 below threshold temperature 224.

In still other illustrative examples, temperature regulation system 216 may provide predictive cooling 248 using controller 230. Predictive cooling 248 may include a pre-programmed set of behaviors for cooling system 232 based on known phenomena in the manufacturing process. For instance, at the start of laying up composite material 218 onto substrate 220, cooling system 232 may be off. As the process continues, controller 230 automatically adjusts, without feedback, to a baseline level of cooling for that time period or step in the manufacturing process. Predictive cooling 248 may be used to set baseline behavior of cooling system 232 with number of temperature sensors 228 being used to fine-tune the process.

With an illustrative embodiment, composite manufacturing system 202 can work more efficiently with less risk of going offline due to roller wrap from an over-heated compaction roller 212. As a result, composite structure 204 may be formed more quickly and with less rework than with currently used systems.

The illustrative embodiments also have the capability to quench composite material 218 while under compaction roller 212. Composite material 218 may be chilled under compaction roller 212 such that composite material 218 has more physical strength. As a result, composite material 218 may be maneuvered more easily and locked into place on substrate 220, reducing the risk of undesired inconsistencies 226 forming in composite structure 204. This process may be done through short bursts of fluid 237 provided to compaction roller 212 as composite material 218 is laid onto substrate 220 in real time. Controller 230 controls these bursts based on feedback from the system, pre-set system behaviors, or in some other manner.

The use of an illustrative embodiment also provides precise control of temperature 222 of compaction roller 212 and increased protection for compaction roller 212 as well as other components within composite manufacturing system 202. Temperature regulation system 216 provides active cooling control to prevent degradation of these components from heat generated by heater 214, thus saving additional manufacturing costs and downtime.

Figure 3:
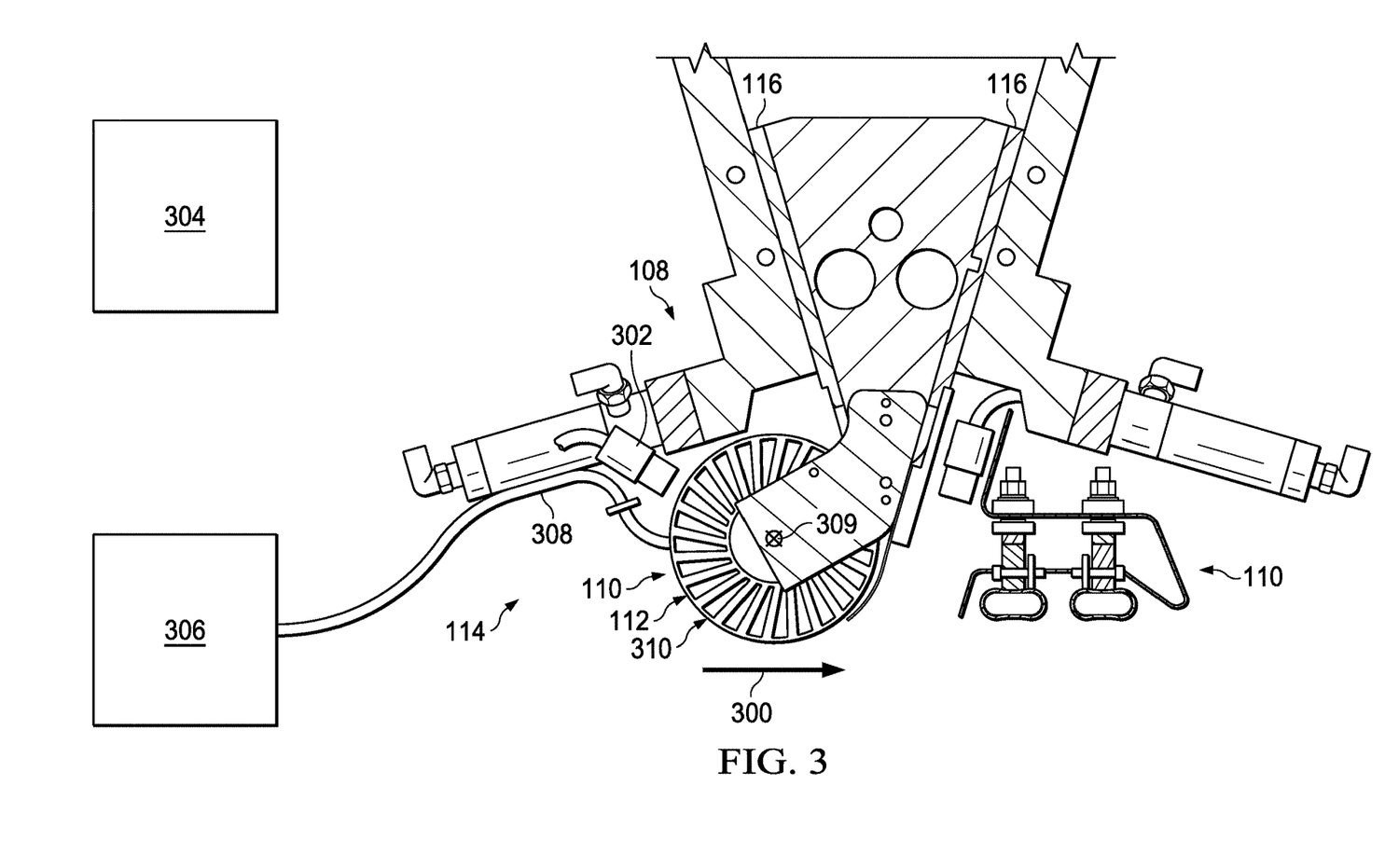
FIG. 3 is an illustration of a cross-sectional view of a composite manufacturing system in accordance with an illustrative embodiment.

With reference next to FIG. 3, an illustration of a cross-sectional view of a composite manufacturing system is depicted in accordance with an illustrative embodiment. A cross sectional view of fiber placement head 108 from is shown along lines 3-3 in FIG. 1. FIG. 3 illustrates an example of physical implementations of components within composite manufacturing system 202 shown in block form in FIG. 2.

As depicted, fiber placement head 108 moves in the direction of arrow 300 to place composite material 116 onto substrate 118. As fiber placement head 108 moves, temperature regulation system 114 monitors and controls the temperature of compaction roller 112.

In this illustrative example, temperature regulation system 114 comprises temperature sensor 302, controller 304, cooling system 306, and supply line 308. Cooling system 306 is a chiller that supplies cooled air to compaction roller 212 through supply line 308 in this illustrative example. Cooled air is dissipated out of compaction roller 112 in the direction of arrow 309.

In other illustrative examples, cooled liquid may flow through supply line 308. Such liquid would then flow through compaction roller 112 and be redirected back to cooling system 306.

Temperature sensor 302 continuously monitors the temperature on surface 310 of compaction roller 312 as fiber placement head 108 moves along its path. The flow of air through supply line 308 is adjusted by controller 304 as the temperature of surface 310 of compaction roller 112 changes.

Figure 4:
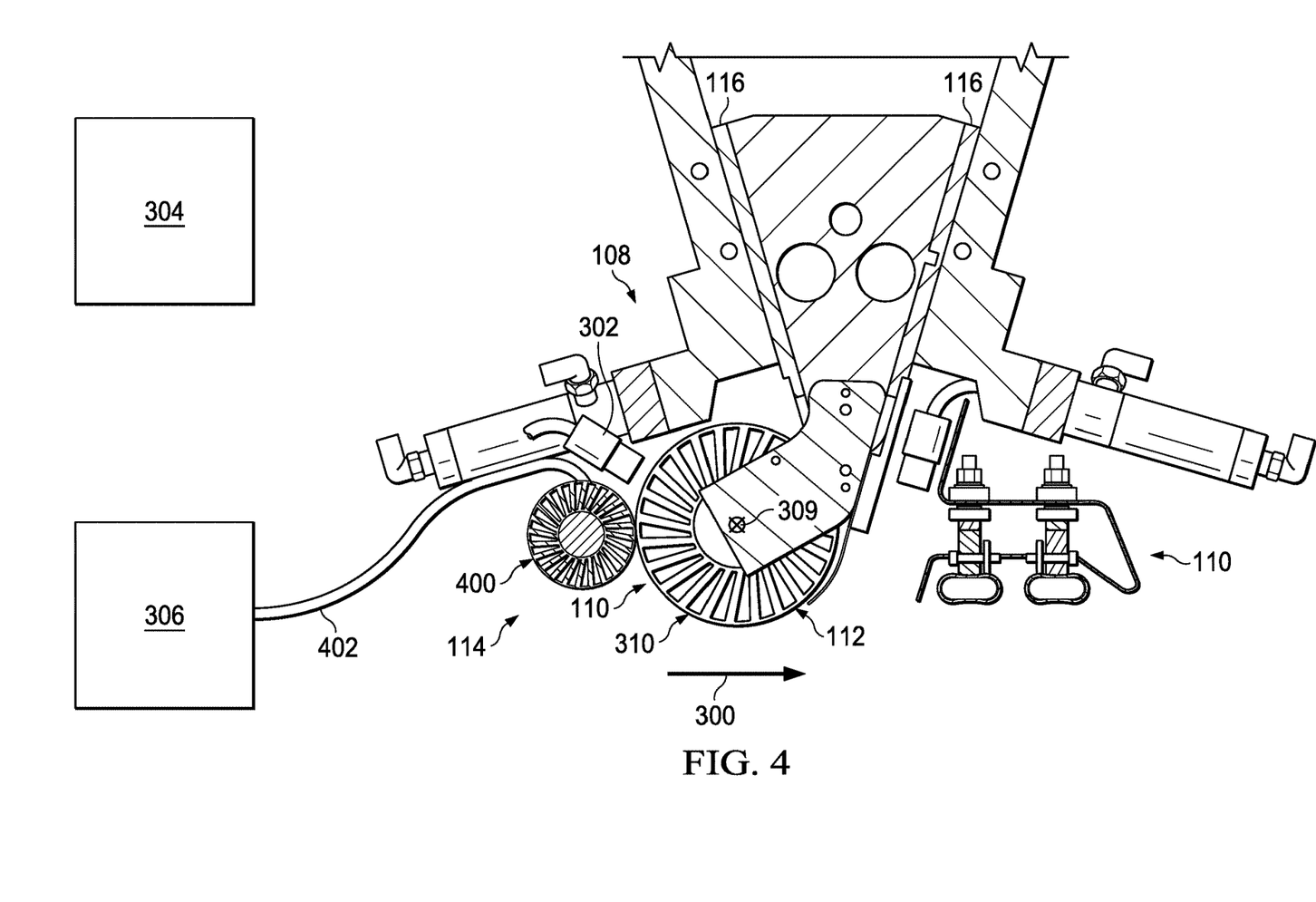
FIG. 4 is another illustration of a cross-sectional view of a composite manufacturing system in accordance with an illustrative embodiment.

Turning now to FIG. 4, another illustration a cross-sectional view of a composite manufacturing system is depicted in accordance with an illustrative embodiment. FIG. 4 also illustrates an example of physical implementations of components within composite manufacturing system 202 shown in block form in FIG. 2.

As illustrated, chilled roller 400 has been added to fiber placement head 108. Chilled roller 400 is in conductive contact with compaction roller 112. Supply line 308 has been removed. Supply line 402 directs cooled air and/or cooled liquid to chilled roller 400 such that chilled roller 400 decreases the temperature of surface 310 of compaction roller 112 through conduction.

Figure 5:
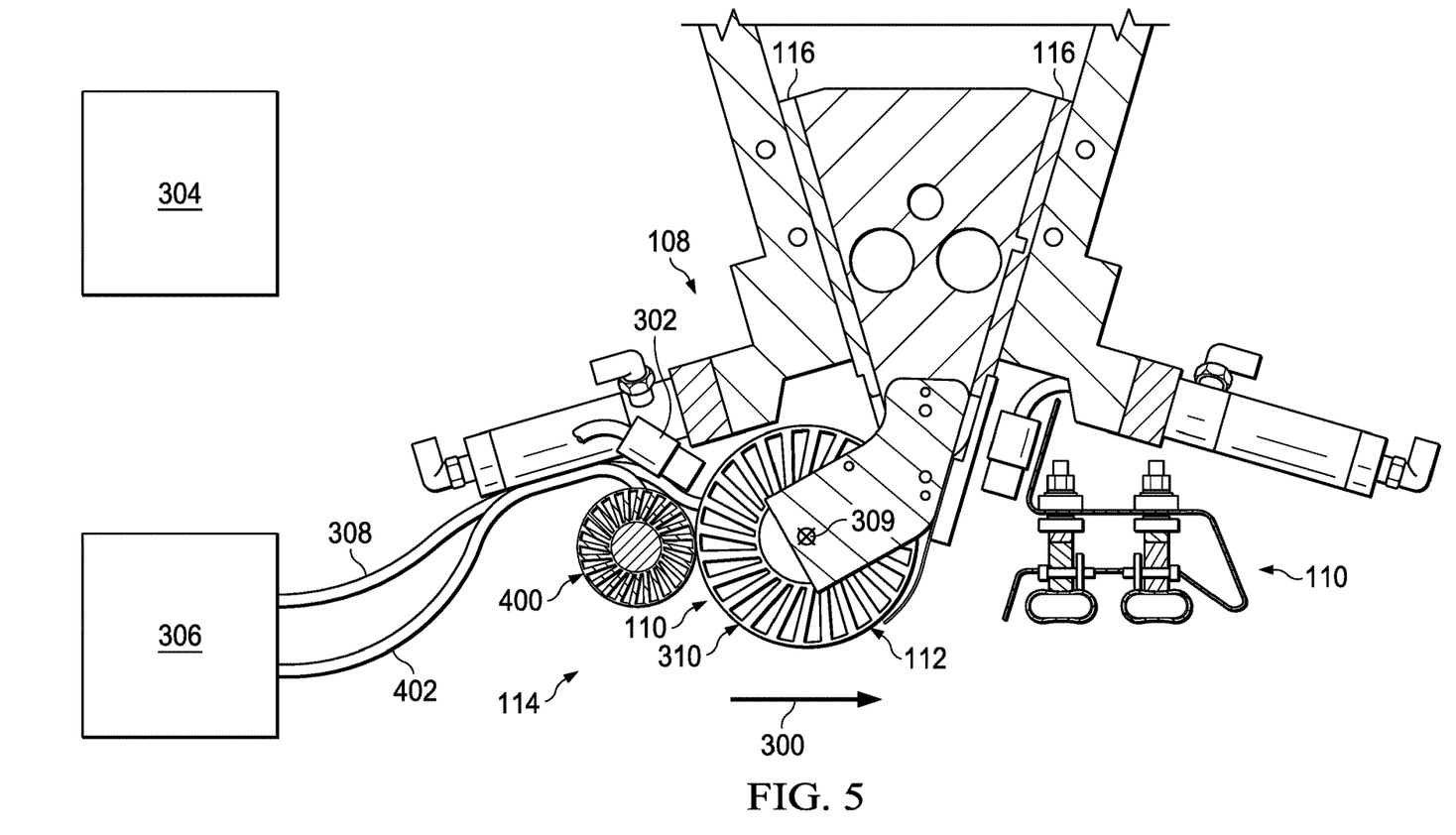
FIG. 5 is yet another illustration of a cross-sectional view of a composite manufacturing system in accordance with an illustrative embodiment.

In FIG. 5, yet another illustration of a cross-sectional view of a composite manufacturing environment is depicted in accordance with an illustrative embodiment. In this illustrative example, supply line 308 supplies cooled air from cooling system 306 to compaction roller 112. At substantially the same time, cooled air and/or cooled liquid flows through supply line 402 from cooling system 306 to chilled roller 400. Controller 304 may adjust the flow of fluid through at least one of supply line 308 and supply line 402 to bring the temperature of surface 310 of compaction roller 112 below the threshold temperature.

Figure 6:
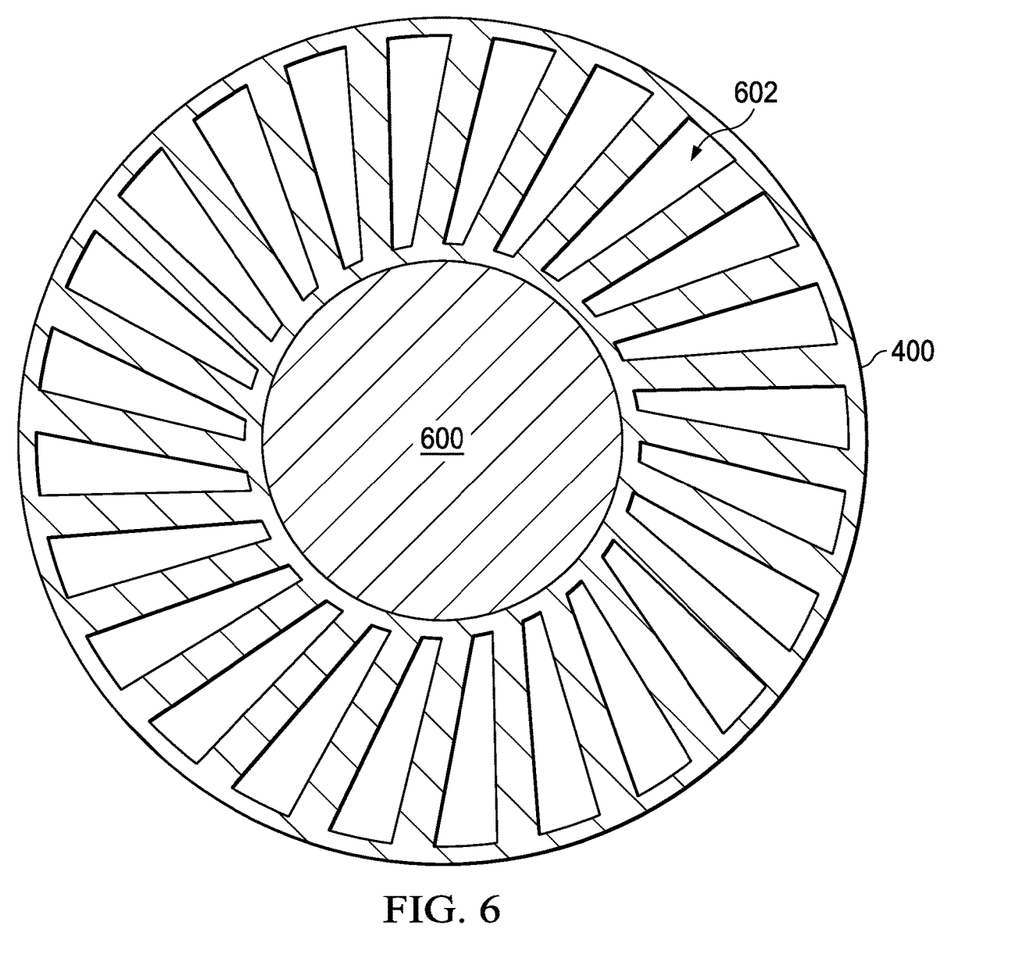
FIG. 6 is an illustration of a cross-sectional view of a roller in accordance with an illustrative embodiment.

Turning next to FIG. 6, an illustration of a cross-sectional view of a roller in a composite manufacturing system is depicted in accordance with an illustrative embodiment. A more-detailed cross-sectional view of chilled roller 400 is shown.

As depicted, chilled roller 400 has core 600 and channels 602. Channels 602 direct cooled fluid through chilled roller 400. Channels 602 may be formed as part of chilled roller 400. Although channels 602 are shown with reference to chilled roller 400 in this figure, compaction roller 112 may have channels as well, depending on the particular implementation.

The different components shown in FIG. 1 and FIGS. 3-6 may be combined with components in FIG. 2, used with components in FIG. 2, or a combination of the two. Additionally, some of the components in FIG. 1 and FIGS. 3-6 may be illustrative examples of how components shown in block form in FIG. 2 may be implemented as physical structures.

Other configurations for composite manufacturing system 100 may be implemented other than those shown in FIGS. 1 and 3-6. For instance, although only one temperature sensor and one chiller are shown in FIGS. 3-6, two sensors, five sensors, or some other number of sensors or chillers may be implemented in temperature regulation system 114. Each temperature sensor communicates with controller 304. In other illustrative examples, one or more of compaction roller 112 or chilled roller 400 may be completely or partially hollow. In still other illustrative examples, more than two supply lines may supply cooled fluid to different areas in one or more of the rollers.

Figure 7:
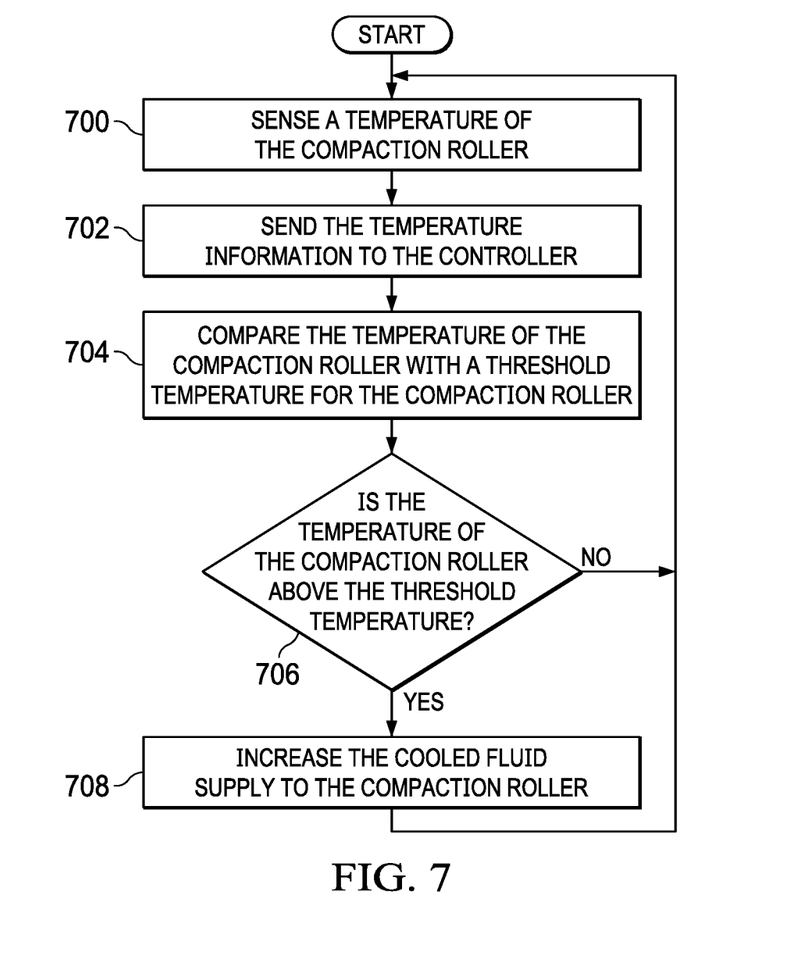
FIG. 7 is an illustration of a flowchart of a process for regulating a temperature of a compaction roller in a composite manufacturing system in accordance with an illustrative embodiment.

With reference next to FIG. 7, an illustration of a flowchart of a process for regulating a temperature of a compaction roller in a composite manufacturing system is depicted in accordance with an illustrative embodiment. The method depicted in FIG. 7 may be used with temperature regulation system 216 to regulate temperature 222 of compaction roller 212 in FIG. 2.

The process begins by sensing a temperature of the compaction roller (operation 700). Next, the process sends the temperature information to the controller (operation 702). The controller compares the temperature of the compaction roller with a threshold temperature for the compaction roller (operation 704). The controller then determines whether the temperature of the compaction roller is above the threshold temperature (operation 706). If the temperature of the compaction roller is not above the threshold temperature, the process returns to operation 700. If the temperature of the compaction roller is above the threshold temperature, the process increases the cooled fluid supply to the compaction roller (operation 708), with the process returning to operation 700 thereafter. In this manner, temperature regulation system 216 actively regulates temperature 222 of compaction roller 212. Regulation may include reducing or increasing the flow of cooled fluid or shutting off the cooling system completely.

Figure 8:
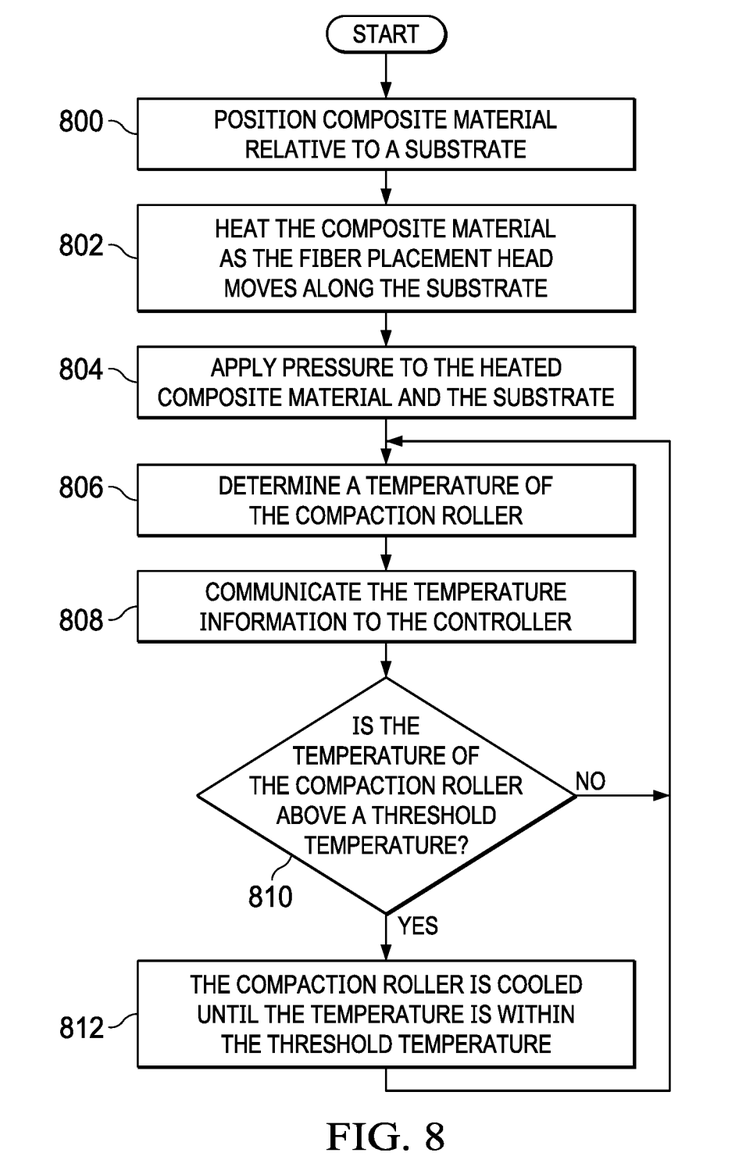
FIG. 8 is an illustration of a flowchart of a process for forming a composite structure for an aircraft in accordance with an illustrative embodiment.

Turning now to FIG. 8, an illustration of a flowchart of a process for manufacturing a composite structure for an aircraft is depicted in accordance with an illustrative embodiment. The method depicted in FIG. 8 may be used with composite manufacturing system 202 to form composite structure 204 in FIG. 2.

The process begins by positioning composite material relative to a substrate (operation 800). Next, the composite material is heated as the fiber placement head moves along the substrate (operation 802). A compaction roller applies pressure to the heated composite material and the substrate (operation 804).

Thereafter, a temperature of the compaction roller is determined (operation 806). The process then communicates the temperature information to a controller (operation 808).

The process next determines whether the temperature of the compaction roller is above a threshold temperature (operation 810). If the temperature of the compaction roller is not above the threshold temperature, the process returns to operation 806. If the temperature of the compaction roller is above the threshold temperature, the compaction roller is cooled until the temperature is below the threshold temperature (operation 812), with the process returning to operation 806 thereafter.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 9:
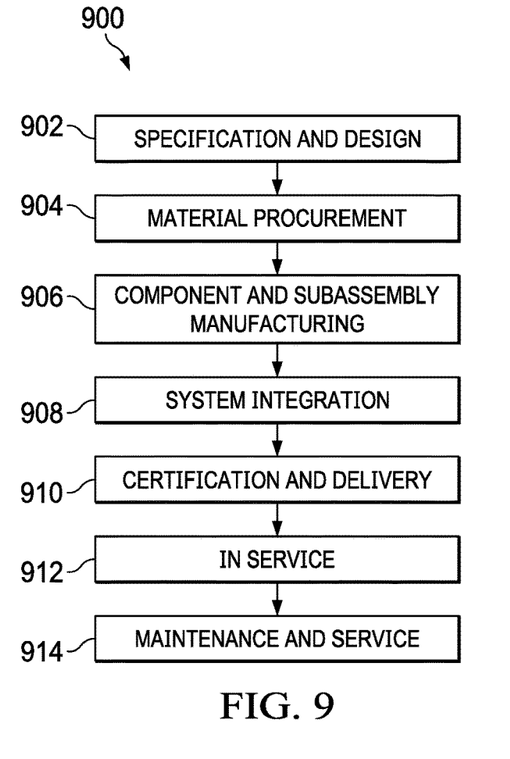
FIG. 9 is an illustration of a block diagram of an aircraft manufacturing and service method in accordance with an illustrative embodiment.
Figure 10:
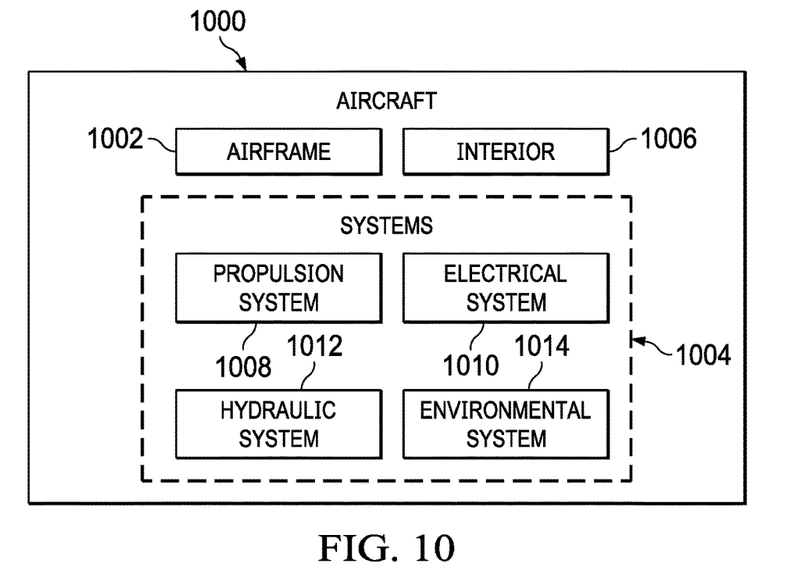
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Composite structure 204 from FIG. 2 may be made using composite manufacturing system 202 with temperature regulation system 216 during component and subassembly manufacturing 906. In addition, components within composite manufacturing system 202 may be used during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which a composite structure made using an illustrative embodiment may be implemented. In this example, aircraft 1000 is produced by aircraft manufacturing and service method 900 in FIG. 9 and may include frame 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

With the use of an illustrative embodiment, a composite manufacturing system can work more efficiently with less risk of going offline due to roller wrap from an over-heated compaction roller. As a result, composite structures are formed more quickly and with less rework than with currently used systems.

The illustrative embodiments also have precision control cooling capabilities. Fluid supplies may be controlled through a system of valves and supply lines. Conduction cooling also provides a novel feature over currently used manufacturing systems. The controller can regulate the temperature of the compaction roller to quench the tows while under the compaction roller. Chilling the tow while under compaction pressure increases its strength and allows for more precise maneuvering in complex geometries with a reduced risk of wrinkling or puckering.

When using thermoplastics, an illustrative embodiment provides protection for components within the fiber placement head. Controlling roller temperature helps prevent degradation of these components from excess heat, thus saving additional manufacturing costs and downtime.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for regulating a temperature of a compaction roller in a composite manufacturing system, the method comprising:
   sensing the temperature of the compaction roller;
   determining whether the temperature of the compaction roller is below a threshold temperature;
   cooling the compaction roller until the temperature of the compaction roller is below the threshold temperature; and
   controlling predictive cooling of the compaction roller comprising automatically adjusting, without feedback, to a baseline level of cooling for a time period or step in a manufacturing process.

2. The method of claim 1, wherein cooling the compaction roller comprises:
   supplying cooled air through the compaction roller until the temperature of the compaction roller is below the threshold temperature.

3. The method of claim 1, wherein cooling the compaction roller comprises:
   supplying at least one of cooled air or cooled liquid to a chilled roller in conductive contact with the compaction roller until the temperature of the compaction roller is below the threshold temperature.

4. The method of claim 1, wherein cooling the compaction roller comprises:
   supplying cooled air to the compaction roller; and
   supplying at least one of the cooled air or cooled liquid to a chilled roller in conductive contact with the compaction roller.

5. The method of claim 1, further comprising:
   controlling a flow of at least one of cooled air or cooled liquid through the compaction roller to provide predictive cooling for the compaction roller.

6. The method of claim 1, wherein cooling the compaction roller comprises:
   controlling a flow of cooled air through a number of channels in the compaction roller.

7. The method of claim 1, wherein cooling the compaction roller comprises:
   controlling a flow of cooled air through a number of channels in a chilled roller, wherein the chilled roller is in conductive contact with the compaction roller.

8. A method for forming a composite structure for an aircraft, the method comprising:
   positioning composite material relative to a substrate;
   heating the composite material;
   applying pressure to the composite material and the substrate using a compaction roller;
   sensing a temperature of the compaction roller;
   determining whether the temperature of the compaction roller is below a threshold temperature;
   cooling the compaction roller until the temperature of the compaction roller is below the threshold temperature; and
   controlling predictive cooling of the compaction roller comprising automatically adjusting, without feedback, to a baseline level of cooling for a time period or step in a manufacturing process.

9. The method of claim 8, wherein cooling the compaction roller comprises:
   supplying at least one of cooled air or cooled liquid to the compaction roller until the temperature of the compaction roller is below the threshold temperature.

10. The method of claim 8, wherein cooling the compaction roller comprises:
    supplying at least one of cooled air or cooled liquid to a chilled roller in conductive contact with the compaction roller until the temperature of the compaction roller is below the threshold temperature.

11. The method of claim 8, wherein regulating the temperature of the compaction roller comprises:
    controlling a flow of at least one of cooled air or cooled liquid through a number of channels in the compaction roller.

12. A method for regulating a temperature of a compaction roller in a composite manufacturing system, the method comprising:
    sensing the temperature of the compaction roller using a number of non-contact temperature sensors;
    determining whether the temperature of the compaction roller is below a threshold temperature;
    cooling the compaction roller until the temperature of the compaction roller is below the threshold temperature;
    controlling predictive cooling of the compaction roller comprising automatically adjusting, without feedback, to a baseline level of cooling for a time period or step in a manufacturing process; and
    controlling a flow of at least one of cooled air or cooled liquid through the compaction roller to provide predictive cooling for the compaction roller.

13. The method of claim 12, wherein cooling the compaction roller comprises:
    supplying cooled air through the compaction roller until the temperature of the compaction roller is below the threshold temperature.

14. The method of claim 12, wherein cooling the compaction roller comprises:
    supplying at least one of cooled air or cooled liquid to a chilled roller in conductive contact with the compaction roller until the temperature of the compaction roller is below the threshold temperature.

15. The method of claim 12, wherein cooling the compaction roller comprises:
    supplying cooled air to the compaction roller; and
    supplying at least one of the cooled air or cooled liquid to a chilled roller in conductive contact with the compaction roller.

16. The method of claim 12, wherein cooling the compaction roller comprises:
    supplying cooled liquid through the compaction roller until the temperature of the compaction roller is below the threshold temperature.

17. The method of claim 12, wherein cooling the compaction roller comprises:
    controlling a flow of cooled air through a number of channels in the compaction roller.

18. The method of claim 12, wherein cooling the compaction roller comprises:
    controlling a flow of cooled air through a number of channels in a chilled roller, wherein the chilled roller is in conductive contact with the compaction roller.

19. The method of claim 14, further comprising sensing the temperature of the chilled roller using a number of temperature sensors.

20. The method of claim 15, further comprising sensing the temperature of the chilled roller using a number of temperature sensors.

\* \* \* \* \*